US012769481B2

(12) United States Patent
Hu

(10) Patent No.: US 12,769,481 B2
(45) Date of Patent: Oct. 20, 2026

(54) DATA WRITING METHOD AND DATA MANAGEMENT METHOD BASED ON SIMULATED EEPROM

(71) Applicant: AUTOCHIPS WUHAN CO., LTD., Wuhan (CN)

(72) Inventor: Chunlin Hu, Wuhan (CN)

(73) Assignee: AUTOCHIPS WUHAN CO., LTD., Wuhan (CN)

( * ) Notice: Subject to any disclaimer, the term of this patent is extended or adjusted under 35 U.S.C. 154(b) by 0 days.

(21) Appl. No.: 18/872,567

(22) PCT Filed: Mar. 27, 2023

(86) PCT No.: PCT/CN2023/084118
§ 371 (c)(1),
(2) Date: Dec. 6, 2024

(87) PCT Pub. No.: WO2023/241160
PCT Pub. Date: Dec. 21, 2023

(65) Prior Publication Data

US 2026/0072616 A1 Mar. 12, 2026

(30) Foreign Application Priority Data

Jun. 13, 2022 (CN) ......................... 202210661510.8

(51) Int. Cl.
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ..... G06F 3/0659; G06F 3/0619; G06F 3/0679
(Continued)

(56) References Cited

U.S. PATENT DOCUMENTS 10,228,868 B1 * 3/2019 Liang .................... G06F 3/0653
11,042,481 B1 * 6/2021 Virani ................. G06F 9/30047
(Continued)

FOREIGN PATENT DOCUMENTS

CN 101149664 A 3/2008
CN 101739306 A 6/2010
(Continued)

OTHER PUBLICATIONS

Notice of Allowance, Chinese Application No. 202210661510.8.
(Continued)

*Primary Examiner* — Gautam Sain
(74) *Attorney, Agent, or Firm* — Jacob M. Ward; Ward Law Office LLC

(57) ABSTRACT

The present disclosure provides a data writing method and a data management method based on a simulated EEPROM, where the simulated EEPROM includes a static random access memory and a flash, the flash includes at least two storage groups, and the at least two storage groups include a first storage group and a second storage group. The data writing method includes: writing to-be-written data into a target address of the static random access memory; and writing the to-be-written data into the first storage group in a preset writing order, and determining whether the first storage group is in a full storage state; when the first storage group is in the full storage state, writing the to-be-written data into the second storage group in the preset writing order, and erasing the to-be-written data in the first storage group.

19 Claims, 5 Drawing Sheets

(58) Field of Classification Search
USPC .......................................................... 711/154
See application file for complete search history.

(56) References Cited

U.S. PATENT DOCUMENTS

2001/0030890 A1* 10/2001 Yamagami ........... G11C 29/765 365/185.09
2001/0037437 A1* 11/2001 Ishikawa ............. G06F 12/0638 711/E12.083
2005/0251617 A1* 11/2005 Sinclair ................... G06F 3/061 711/170
2006/0143365 A1* 6/2006 Kikuchi ................ G06F 3/0614 711/202
2007/0101095 A1* 5/2007 Gorobets ............ G06F 12/0246 711/E12.008
2008/0098164 A1* 4/2008 Lee ..................... G06F 12/0866 711/E12.019
2010/0205348 A1 8/2010 Moshayedi et al.
2010/0269015 A1* 10/2010 Borchers ............. G06F 12/0813 710/308
2021/0264996 A1 8/2021 Lin et al.

FOREIGN PATENT DOCUMENTS

CN 103268294 A 8/2013
CN 103294615 A 9/2013
CN 105162786 A 12/2015
CN 113380308 A 9/2021
CN 114371814 A 4/2022
CN 114756179 A 7/2022

OTHER PUBLICATIONS

International Search Report; PCT/CN2023/084118; Jun. 14, 2023; 13 pages.
Chinese Office Action; CN202210661510.8; Jul. 26, 2022; 20 pages.
Chinese Office Action; CN202210661510.8; Aug. 23, 2022; 21 pages.

* cited by examiner

DATA WRITING METHOD AND DATA MANAGEMENT METHOD BASED ON SIMULATED EEPROM

CROSS-REFERENCE TO RELATED APPLICATIONS

The present application is a National Stage of International Application No. PCT/CN2023/084118, filed on Mar. 27, 2023, which claims priority to Chinese Patent Application No. 202210661510.8, filed on Jun. 13, 2022, to the China National Intellectual Property Administration and entitled "DATA WRITING METHOD AND DATA MANAGEMENT METHOD BASED ON SIMULATED EEPROM". These applications are incorporated into the present application by reference in their entireties.

TECHNICAL FIELD

The present disclosure relates to the field of embedded software technology and, in particular, to a data writing method and a data management method based on a simulated EEPROM.

BACKGROUND

In many situations of embedded applications, some critical data needs long-term preservation and may be frequently modified. During the embedded development, an electrically erasable programmable read-only memory (EEPROM) is used in many product scenarios to store non-volatile data that needs to be kept in applications.

In prior arts, an EEPROM is generally formed by a flash, where a built-in flash is divided into multiple "pages", and for each page, an additional space is found in the flash to store an address and state information. When writing data into the EEPROM, the data will be written into a certain address of a current active "page", and the address and state information will be written into another specific area simultaneously; when reading the EEPROM, first the address and the state information are read, and then the address corresponding to the "page" is located according to the obtained information; when the current "page" is full, it is necessary to sequentially read out the values stored in this "page", and after a next working "page" is selected, the data is copied to the next working "page". The above-described technology is limited by the bit width of the flash, and the implementation method is relatively complex and requires separate division, in the flash, of an area for address and state information storage. When reading the EEPROM, the corresponding storage location in the flash can be found following complex addressing, hence multiple clock cycles will be taken to read the EEPROM. In order to solve the technical problem existing in the above-described technical solutions that the EEPROM reading is long in cycles, the prior arts propose a technical solution of using a non-volatile memory (NVM) and a random access memory (RAM) to form an EEPROM. The NVM is divided into multiple sectors internally, but only one sector is in a working state. An area is separately divided in each sector, used for storing a status label of this sector (the status label including an erase counter, a deactivation label, and a deregistration label). When data is written into an EEPROM system, the data is first stored in the RAM, while an address and data information of the RAM are stored in a working sector of the NVM; when reading the EEPROM, the data directly comes from the RAM; after a power failure, the data stored in the NVM will be synchronized to the RAM, since the data stored in the NVM is not lost.

The above-described technical solution has the following problems: a storage area needs to be separately divided to store the status label, thus the data management mechanism is complex. Therefore, there is an urgent need to provide a data writing method and a data management method based on a simulated EEPROM, to solve the technical problem in the prior arts that the data management mechanism for the EEPROM is complex.

SUMMARY

In view of this, it is necessary to provide a data writing method and a data management method based on a simulated EEPROM, to solve the technical problem existing in the prior arts that a data management mechanism for an EEPROM is complex.

In order to solve the above-described technical problem, the present disclosure provides a data writing method based on a simulated EEPROM, where the simulated EEPROM includes a static random access memory and a flash, the flash includes at least two storage groups, the at least two storage groups include a first storage group and a second storage group; the data writing method based on the simulated EEPROM includes: writing to-be-written data into a target address of the static random access memory; and writing the to-be-written data into the first storage group in a preset writing order, and determining whether the first storage group is in a full storage state; when the first storage group is in the full storage state, writing the to-be-written data into the second storage group in the preset writing order, and erasing the to-be-written data in the first storage group.

In some possible implementations, the data writing method based on the simulated EEPROM further includes: packaging the to-be-written data, the target address and additional information, to generate a to-be-verified data packet, where the additional information includes a valid flag bit. In some possible implementations, the data writing method based on the simulated EEPROM further includes: determining, based on the valid flag bit, whether the to-be-verified data packet is valid; when the to-be-verified data packet is valid, writing the to-be-verified data packet into the first storage group in the preset writing order; and determining whether the first storage group is in the full storage state; when the first storage group is in the full storage state, repackaging the to-be-written data, the target address and the additional information, to generate a recombinant data packet; and writing the recombinant data packet into the second storage group in the preset writing order, and erasing the to-be-verified data packet in the first storage group.

In some possible implementations, the at least two storage groups include a head storage group, at least one middle storage group and a tail storage group; when the first storage group is the head storage group or the middle storage group, the second storage group is a next storage group adjacent to the first storage group; when the first storage group is the tail storage group, the second storage group is the head storage group.

In another aspect, the present disclosure further provides a data management method based on a simulated EEPROM, where the simulated EEPROM includes a static random access memory and a flash, the flash includes at least two storage groups, the at least two storage groups include a first storage group and a second storage group; the data management method based on the simulated EEPROM includes:

writing EEPROM data according to a data writing method based on the simulated EEPROM; reading the EEPROM data according to a data reading method based on the simulated EEPROM; where the data writing method based the simulated EEPROM includes: writing to-be-written data into a target address of the static random access memory; and writing the to-be-written data into the first storage group in a preset writing order, and determining whether the first storage group is in a full storage state; when the first storage group is in the full storage state, writing the to-be-written data into the second storage group in the preset writing order, and erasing the to-be-written data in the first storage group.

In some possible implementations, the at least two storage groups include a head storage group, at least one middle storage group and a tail storage group; when the first storage group is the head storage group or the middle storage group, the second storage group is a next storage group adjacent to the first storage group; when the first storage group is the tail storage group, the second storage group is the head storage group.

In some possible implementations, a respective storage group of the storage groups includes a head row, multiple middle rows and a tail row, the head row and the middle rows are used to store to-be-read data; the data reading method based the simulated EEPROM includes: reading the head row and the tail row of the respective storage group of the storage groups in sequence, and determining, through a preset information packet marking bit, whether both the head row and the tail row are valid; and when both the head row and the tail row are valid, reading the to-be-read data in a preset reading order.

In some possible implementations, the head row and the middle rows are further used to store address information, the reading the to-be-read data in the preset reading order includes: determining, based on the address information, the target address of the static random access memory, and reading the to-be-read data to the target address; and reading the to-be-read data from the target address of the static random access memory.

In some possible implementations, the determining, based on the address information, the target address of the static random access memory includes: determining, based on the preset information packet marking bit, whether the to-be-read data is valid data; and when the to-be-read data is the valid data, determining, based on the address information, the target address of the static random access memory.

In some possible implementations, the reading the to-be-read data to the target address includes: checking a quantity of erroneous bits in the to-be-read data; when the quantity of erroneous bits is greater than a threshold quantity of bits, generating erroneous state information, and storing the erroneous state information and an address of the flash corresponding to the to-be-read data into a register; and when the quantity of erroneous bits is less than or equal to the threshold quantity of bits, correcting, based on an error correcting code operation, the erroneous bits, to generate corrected data, and writing the corrected data into the target address.

In some possible implementations, the static random access memory includes a function flag bit; the reading the to-be-read data from the target address of the static random access memory includes: determining, based on the function flag bit, whether the to-be-read data is the EEPROM data; and when the to-be-read data is the EEPROM data, reading the to-be-read data from the target address.

In another aspect, the present disclosure further provides a data management system based on a simulated EEPROM, including: a processor, a flash and a static random access memory, where the flash includes multiple storage groups; and the processor is configured to execute the data management method based on the simulated EEPROM according to any one of the foregoing possible implementations.

The beneficial effects of adopting the above embodiments are as follows: according to the data writing method based on the simulated EEPROM provided in the present disclosure, a flash includes a first storage group and a second storage group; during a data writing process, there is no need to separately divide an area for data replacement or state information storage, only to-be-written data needs to be written into the first storage group in a preset writing order, or when the first storage group is in a full storage state, the to-be-written data needs to be written into the second storage group in the preset writing order, and the to-be-written data in the first storage group is erased, reducing the complexity of the data management mechanism and improving the flexibility and ease of implementation of the data management mechanism.

BRIEF DESCRIPTION OF DRAWINGS

In order to illustrate the technical solutions of embodiments of the present disclosure more clearly, the drawings that need to be used in the description of the embodiments will be briefly introduced in the following. Obviously, the drawings in the following description are intended for some embodiments of the present disclosure. For those skilled in the art, other drawings can be obtained according to these drawings without any creative effort.

DESCRIPTION OF EMBODIMENTS

Figure 1:
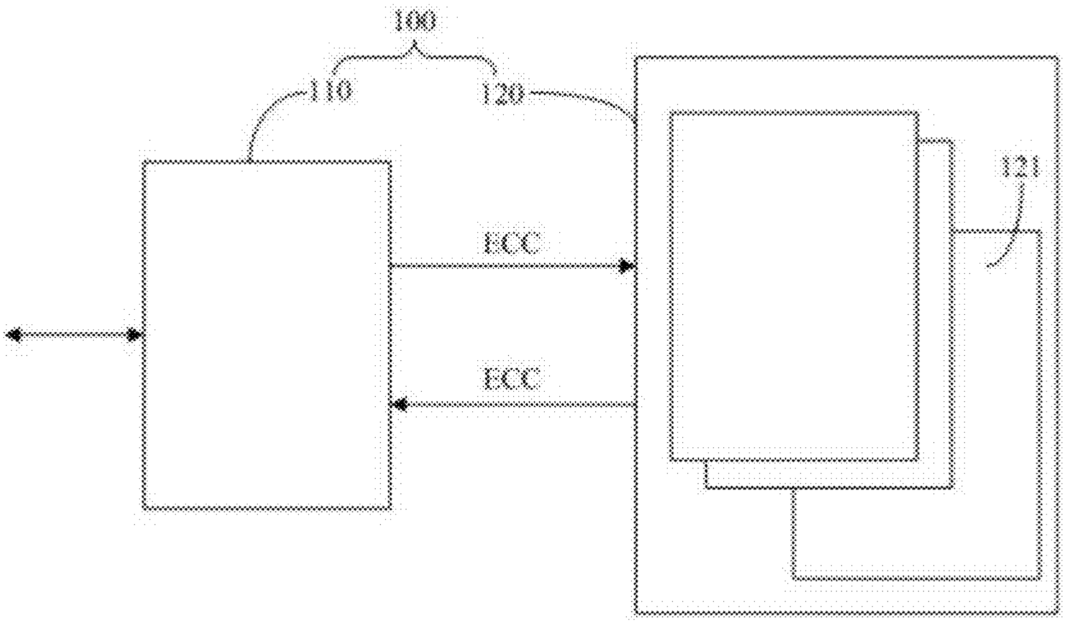
FIG. 1 is a schematic structure diagram of an embodiment of a simulated EEPROM according to the present disclosure.

The following will provide a clear and comprehensive description of the technical solution in the embodiments of the present disclosure in conjunction with the accompanying drawings of the embodiments of the present disclosure. Obviously, the described embodiments are a part of the embodiments of the present disclosure, rather than all of them. Based on the embodiments of the present disclosure, all other embodiments obtained by those of ordinary skill in the art without any creative effort are within the protection scope of the present disclosure.

In the description of the embodiments of the present application, unless otherwise specified, the meaning of “multiple” refers to two or more.

It should be understood that the illustrative drawings are not drawn to scale in accordance with an actual object. The flowcharts used in the present disclosure illustrate the operations implemented according to some embodiments of the present disclosure. It should be understood that the operations in the flowcharts can be implemented in a non-sequential manner, and steps without logical contextual relationships can be reversed in order or implemented simultaneously. In addition, those skilled in the art can add one or more other operations to the flowcharts or remove one or more operations from the flowcharts under the guidance of the content of the present disclosure.

Some of the block diagrams shown in the drawings are functional entities and may not necessarily correspond to physically or logically independent entities. These functional entities can be implemented in a software form, or implemented in one or more hardware modules or integrated circuits, or implemented in different networks and/or processor systems and/or microcontroller systems.

The mention of “embodiments” in this text means that specific features, structures, or characteristics described in conjunction with the embodiments may be included in at least one embodiment of the present disclosure. The phrase appearing in various positions in the description does not necessarily refer to the same embodiment, nor is it an independent or alternative embodiment in mutual exclusion with other embodiments. Those skilled in this art explicitly and implicitly understand that the embodiments described in this text can be combined with other embodiments.

The present disclosure provides a data writing method and a data management method based on a simulated EEPROM, which will be described respectively in the below.

Figure 2:
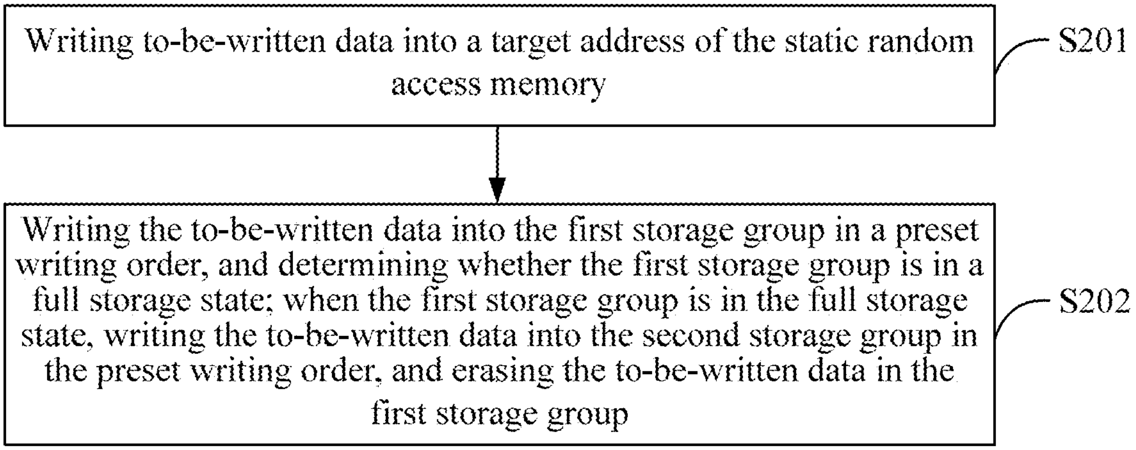
FIG. 2 is a schematic flowchart of an embodiment of a data writing method based on a simulated EEPROM according to the present disclosure.
Figure 3:
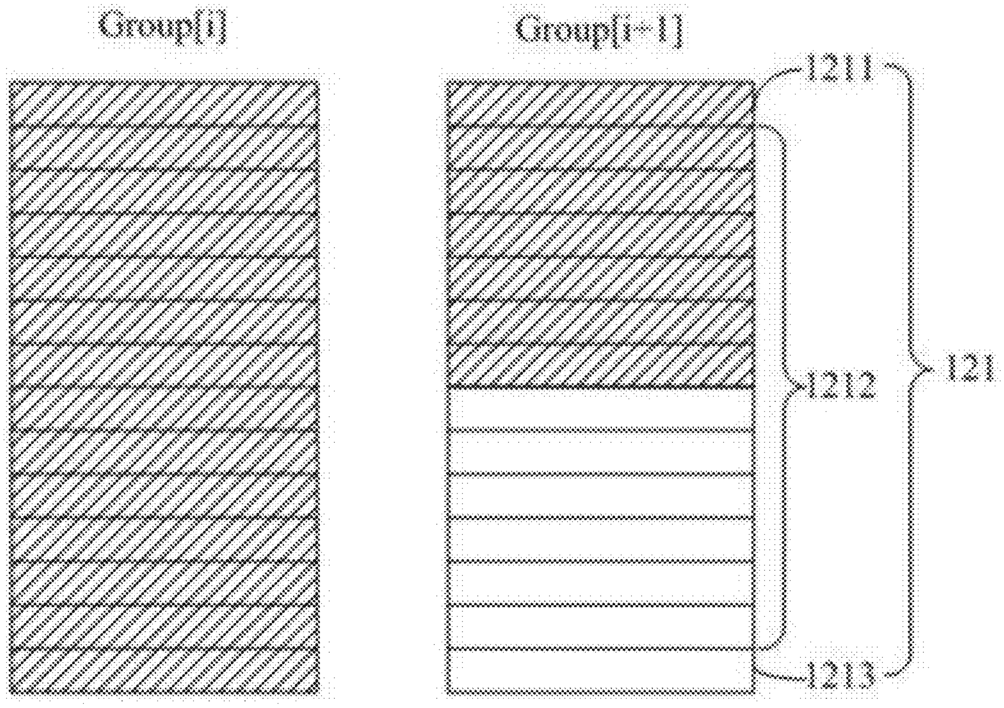
FIG. 3 is a schematic structure diagram of an embodiment of a flash according to the present disclosure.

FIG. 1 is a schematic structure diagram of an embodiment of a simulated EEPROM according to the present disclosure, FIG. 2 is a schematic flowchart of an embodiment of a data writing method based on a simulated EEPROM according to the present disclosure, FIG. 3 is a schematic structure diagram of an embodiment of a flash according to the present disclosure. As shown in FIG. 1 to FIG. 3, a simulated EEPROM 100 includes a static random access memory 110 and a flash 120, the flash 120 includes multiple storage groups 121, the multiple storage groups 121 include a first storage group Group[i] and a second storage group Group [i+1]; the data writing method based on the simulated EEPROM includes:

- S201, writing to-be-written data into a target address of the static random access memory 110;
- S202, writing the to-be-written data into the first storage group Group[i] in a preset writing order, and determining whether the first storage group Group[i] is in a full storage state; when the first storage group Group[i] is in the full storage state, writing the to-be-written data into the second storage group Group[i+1] in the preset writing order, and erasing the to-be-written data in the first storage group Group[i].

Compared with the prior arts, according to the data writing method based on the simulated EEPROM provided in the present disclosure, through settings that a flash includes a first storage group Group[i] and a second storage group Group[i+1], during the data writing process, there is no need to separately divide an area for data replacement or state information storage, only the to-be-written data needs to be written into the first storage group Group[i] in a preset writing order, or when the first storage group Group[i] is in a full storage state, the to-be-written data is written into the second storage group Group[i+1] in the preset writing order, and the to-be-written data in the first storage group Group[i] is erased, reducing the complexity of the data management mechanism and improving the flexibility and ease of implementation of the data management mechanism.

In order to improve the utilization rate of the static random access memory 110, the static random access memory 110 can be used as an interface of the simulated EEPROM 100 for caching EEPROM data, or as a regular sram (static random access memory) for storing other data. To avoid the technical problem that the data stored in the simulated EEPROM 100 is erroneous due to storage, caused by other data stored in the static random access memory 110 being written into the flash 120, of the other data into the flash 120 instead of the EEPROM data, in some embodiments of the present disclosure, the data writing method based on the simulated EEPROM further includes: packaging the to-be-written data, the target address and additional information, as a to-be-verified data packet, where the additional information includes a valid flag bit.

The embodiment of the present disclosure can improve the reliability of data written into the flash 120 by determining the validity of the to-be-verified data packet based on the valid flag bit.

It should be noted that the additional information is information additionally added on the basis of the to-be-written data and the target address, which can be adjusted according to actual needs. In addition to a valid check bit (also refer to the valid flag bit), the additional information may also include writing time information, which will not be elaborated here.

It should also be noted that an additional bit should be added to an original bit width of the static random access memory 110 as the valid flag bit.

It should be understood that since the static random access memory 110 has two purposes, data in the static random access memory 110 will first be automatically cleared after a function is switched.

Figure 4:
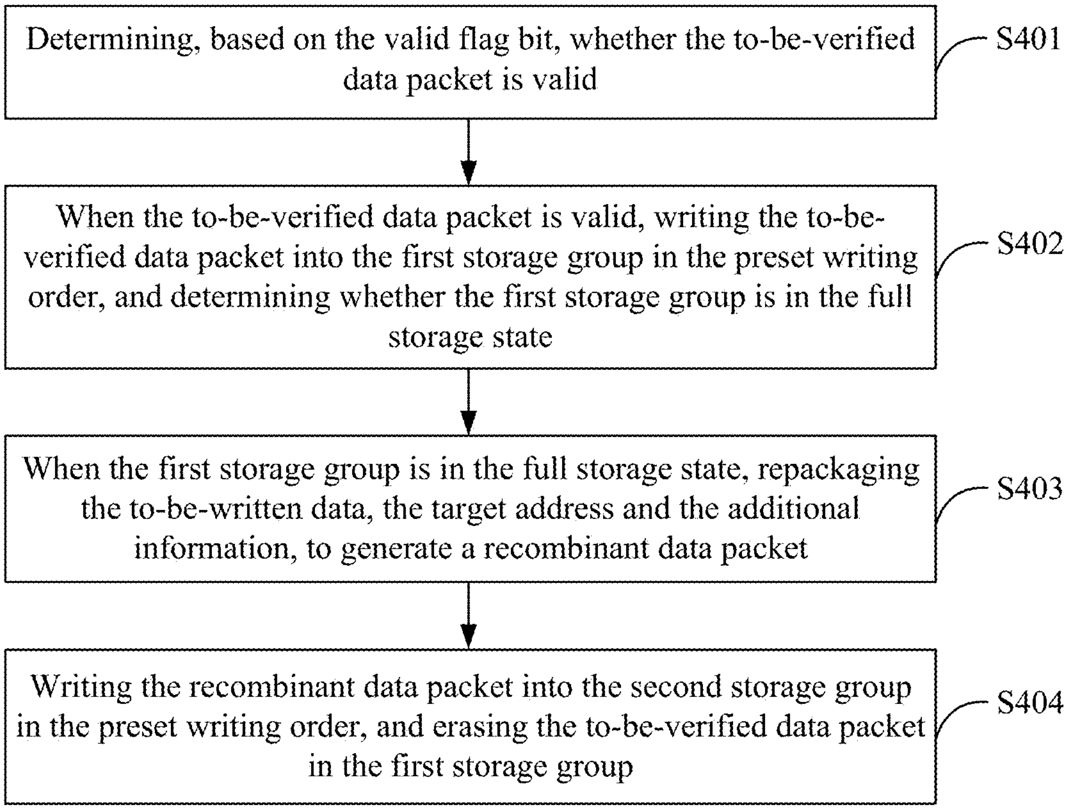
FIG. 4 is a schematic flowchart of an embodiment of S202 in FIG. 2 of the present disclosure.

In some embodiments of the present disclosure, as shown in FIG. 4, the data writing method based on the simulated EEPROM further includes:

- S401, determining, based on the valid flag bit, whether the to-be-verified data packet is valid;
- S402, when the to-be-verified data packet is valid, writing the to-be-verified data packet into the first storage group Group[i] in the preset writing order, and determining whether the first storage group Group[i] is in the full storage state;
- S403, when the first storage group Group[i] is in the full storage state, repackaging the to-be-written data, the target address and the additional information, to generate a recombinant data packet;
- S404, writing the recombinant data packet into the second storage group Group[i+1] in the preset writing order, and erasing the to-be-verified data packet in the first storage group Group[i].

In a specific embodiment of the present disclosure, the original bit width of the static random access memory 110 is 32-bit, a 33-rd bit needs to be added for the static random access memory 110, that is bit[32] is used as the valid flag bit. When bit[32]=0, the to-be-verified data packet is invalid, that is, other data for storage in an ordinary sram is stored; when bit[32]=1, the to-be-verified data packet is valid, that is, EEPROM data for storage in an EEPROM is stored.

Specifically, as shown in FIG. 3, when the first storage group Group[i] is in full storage (shaded area), the to-be-written data, the target address and the additional information are repackaged to generate the recombinant data packet. The recombinant data packet is written into the second storage group Group[i+1] in the preset writing order, and a space occupied by the recombinant data packet in the second storage group Group[i+1] is the shaded area in the second storage group Group[i+1].

It should be noted that the preset writing order is from top to bottom.

It should also be noted that the storage groups 121 include a head storage group, at least one middle storage group and a tail storage group; when the first storage group Group[i] is the head storage group or the middle storage group, the second storage group Group[i+1] is a next storage group adjacent to the first storage group; when the first storage group Group[i] is the tail storage group, the second storage group Group[i+1] is the head storage group.

The mechanism of cyclic operation between storage groups 121 and the writing principle from top to bottom are maintained in the embodiments of the present disclosure, which ensures the regularity of data writing, reduces design difficulty, and improves the ease of implementation of the data writing mechanism.

Furthermore, the embodiments of the present disclosure can ensure that only one storage group 121 is working by setting a cyclic working mechanism. When one cycle is completed, all addresses in the flash 120 have only been used once, thus significantly increasing the lifespan of the flash 120. Moreover, due to the process ensuring that only one storage group 121 is working internally, it is very easy to locate the to-be-verified data packet inside the flash 120, and it is very efficient when the to-be-verified data packet is backfilled from the flash 120 to the static random access memory 110.

It should be understood that writing the to-be-verified data packet into the flash 120 requires at least tens of microseconds, so the process of writing the to-be-verified data packet into the flash 120 requires external feedback of a busy flag, indicating that the simulated EEPROM 100 is currently in a busy state and it is impossible to write other data into the EEPROM 100. The busy flag will only be cleared when the to-be-verified data packet in the first storage group Group[i] is cleared, and a user needs to wait for the busy flag being cleared before continuing to write data to the EEPROM 100.

Since the EEPROM, during usage, may be confronted with environments such as high temperature, high pressure and strong electromagnetic interference, these external factors may cause data errors resulting from "mutations" to the data stored in the flash 120. In order to solve this technical problem, in some embodiments of the present disclosure, the data writing method based on the simulated EEPROM further includes: performing an error correcting code (ECC) operation on the to-be-verified data packet.

Specifically, the ECC operation is accomplished by means of error correcting by adding an extra bit. The ECC operation can tolerate errors and correct the errors, therefore, performing the error correcting code operation on the to-be-verified data packet can improve the accuracy of the to-be-verified data packet.

In some embodiments of the present disclosure, the depth of the storage group 121 is greater than or equal to the depth of the static random access memory 110.

This is because it is necessary to ensure that each storage group 121 has sufficient spaces to correspond one-to-one with the addresses of the static random access memory 110, and in order to avoid the storage groups 121 constantly performing replacement operations between the storage groups 121, the storage groups 121 also need to have extra spaces. Therefore, the depth of the storage group 121 is greater than the depth of the static random access memory 110.

In a specific embodiment of the present disclosure, the depth of the storage group 121 is as twice as the depth of the static random access memory 110. The depth of the storage group 121 is 16, the depth of the static random access memory 110 is 8.

Moreover, since data can only be continuously written to the EEPROM 100 after the to-be-verified data packet in the first storage group Group[i] is cleared, and erasing the to-be-verified data packet in the first storage group Group[i] takes a relatively long time (in milliseconds), thus when the depth of the storage group 121 is too large, it will cause a longer time required for erasing the to-be-verified data packet in the first storage group Group[i], resulting in decreased efficiency of data writing into the simulated EEPROM 100. Therefore, the depth of the storage group 121 should not be too large.

Specifically, the depth of the storage group 121 should be adjusted according to the total space of the flash 120 and the required frequency of writing the to-be-verified data packet, which will not be elaborated here.

Furthermore, in some embodiments of the present disclosure, the last row of the storage group 121 is used to store the number of erasures of the flash 120.

By storing the number of erasures of the flash 120, a user can get knowledge of the remaining lifespan of the simulated EEPROM 100 according to the stored number of erasures, which facilitates timely replacement of the simulated EEPROM 100 and improves the reliability of writing to-be-verified data packet.

Figure 5:
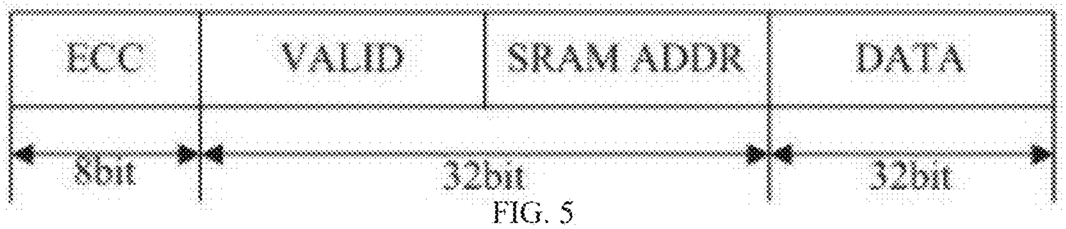
FIG. 5 is a schematic structure diagram of an embodiment of a data format of a to-be-verified data packet according to the present disclosure.

In a specific embodiment of the present disclosure, as shown in FIG. 5, the to-be-verified data packet stored in the flash 120 has the following data format: a bit width of the to-be-verified data packet is 72-bit, Bit[31:00] is used to store to-be-written data (DATA); Bit[63:32] is used to store a target address (SRAM ADDR) and an information packet marking bit (VALID); Bit[71:64] is used to store an error correcting value that have undergone the error correcting code operation.

A format of the last row of each storage group is basically consistent with the data format of the to-be-verified data packet stored in the flash 120. Bit [31:00] is used to store the number of erasures of the simulated EEPROM 100.

It should be understood that the number of erasures of the simulated EEPROM 100 is not equivalent to the number of erasures of the storage group 121, but instead the simulated EEPROM 100 is considered as being only used once after all storage groups 121 have been used once.

Figure 6:
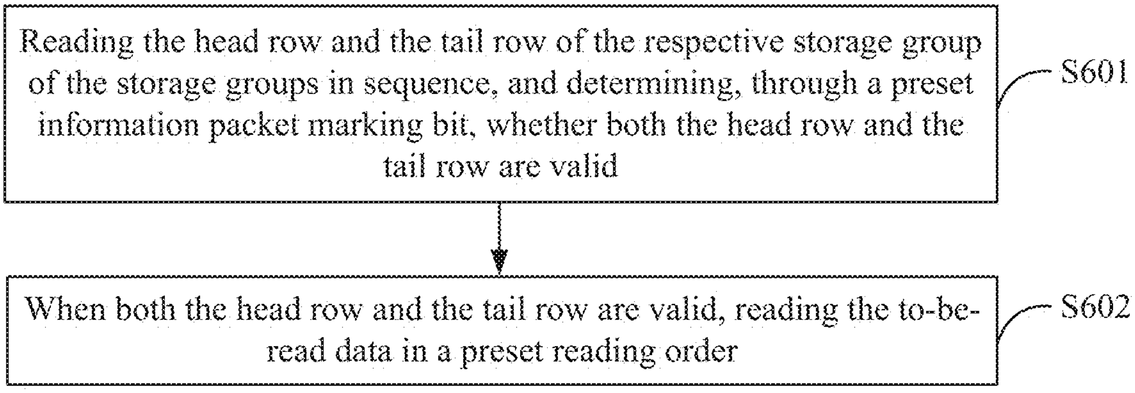
FIG. 6 is a schematic flowchart of an embodiment of a data reading method based on a simulated EEPROM according to the present disclosure.

In another aspect, in order to solve the technical problem of low data reading efficiency in the prior arts, an embodiment of the present disclosure also provides a data reading method based on a simulated EEPROM. As shown in FIG. 3, a respective storage group 121 includes a head row 1211, at least one middle row 1212 and a tail row 1213, the head row 1211 and the middle row 1212 are used to store to-be-read data. As shown in FIG. 6, the data reading method based the simulated EEPROM includes:

S601, reading the head row 1211 and the tail row 1213 of the respective storage group 121 in sequence, and determining, through a preset information packet marking bit, whether both the head row 1211 and the tail row 1213 are valid;

S602, when both the head row 1211 and the tail row 1213 are valid, reading the to-be-read data in a preset reading order.

In the data reading method based on the simulated EEPROM according to the embodiments of the present disclosure, when the user reads data, the to-be-read data directly comes from the static random access memory 110, there is no need to search for the to-be-read data in the flash 120; reading the data from the static random access memory 110 only requires one clock cycle, greatly improving the data reading efficiency.

It should be noted that the preset reading order is an order from top to bottom.

Figure 7:
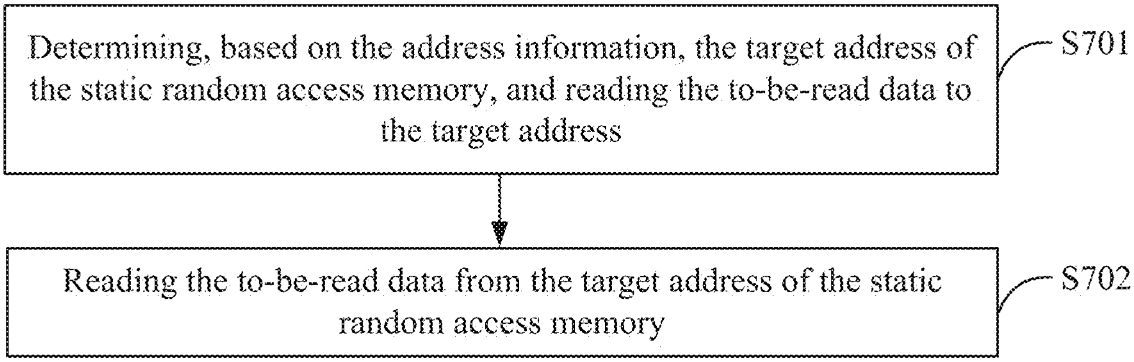
FIG. 7 is a schematic flowchart of an embodiment of S602 in FIG. 6 of the present disclosure.

In some embodiments of the present disclosure, the head row 1211 and the middle row 1212 are used to store address information. As shown in FIG. 7, step S602 includes:

S701, determining, based on the address information, the target address of the static random access memory 110, and reading the to-be-read data to the target address;

S702, reading the to-be-read data from the target address of the static random access memory 110.

Figure 8:
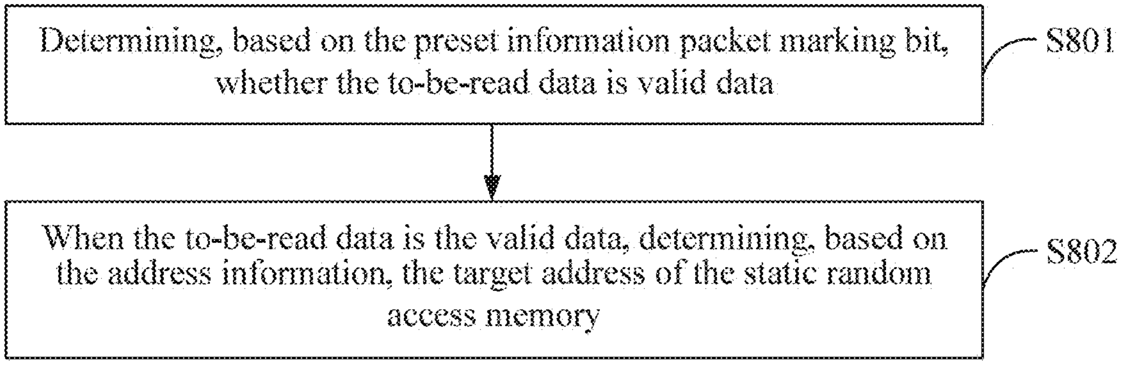
FIG. 8 is a schematic flowchart of an embodiment of S701 in FIG. 7 of the present disclosure.

In some embodiments of the present disclosure, as shown in FIG. 8, step S701 includes:

S801, determining, based on the preset information packet marking bit, whether the to-be-read data is valid data;

S802, when the to-be-read data is the valid data, determining, based on the address information, the target address of the static random access memory 110.

Furthermore, in the embodiments of the present disclosure, the information packet marking bit is used to determine whether the to-be-read data is valid data; when the to-be-read data is the valid data, the to-be-read data will be stored into the static random access memory 110 for users to read, ensuring the reliability of the to-be-read data.

In a specific embodiment of the present disclosure, the information packet marking bit is a 48-th bit to a 63-rd bit of the to-be-read data, that is, bit[63:48]. When bit[63:48] of the head row 1211 and the tail row 1213 is equal to 16'ha5cd, both the head row 1211 and the tail row 1213 are valid.

In some embodiments of the present disclosure, step S602 is specifically: reading downwards in sequence in a principle from top to bottom, and keep reading till the read row is invalid (bit[63:48]=16'hffff). If the read preset information packet marking bit is neither equal to 16'hffff nor equal to 16'ha5cd, the to-be-read data will be discarded.

Figure 9:
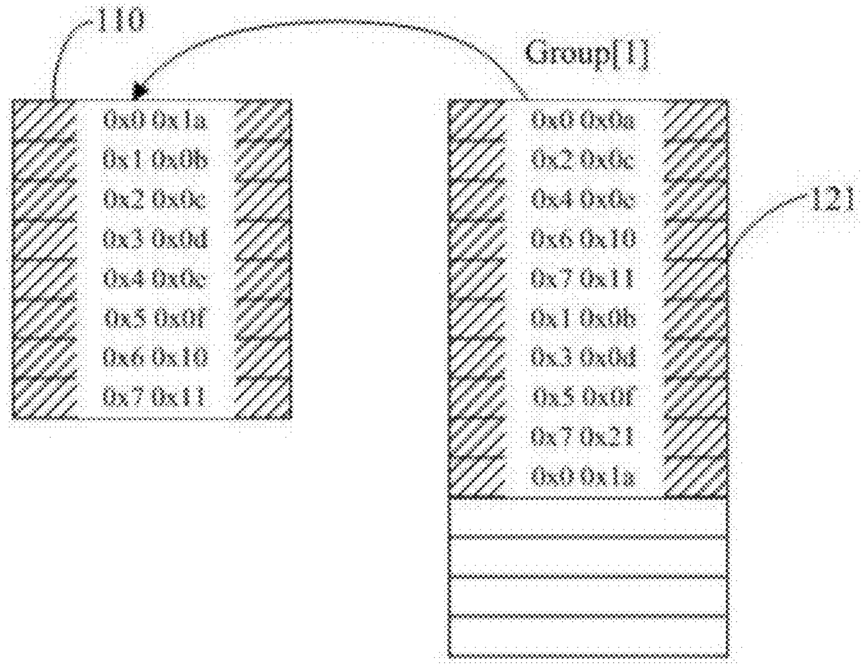
FIG. 9 is a schematic diagram of an embodiment of reading to-be-read data according to the present disclosure.

According to the embodiments of the present disclosure, by setting the principle from top to bottom for reading downwards in sequence, it can be ensured that the read data is most-recent data. For example, as shown in FIG. 9, both the 0-th and 10-th rows in Group[1] correspond to the address 0 of the static random access memory 110, but data in the 10-th row is definitely written for the last time, so 0x1a will overwrite 0x0a for being written to the address 0 of the static random access memory 110.

Figure 10:
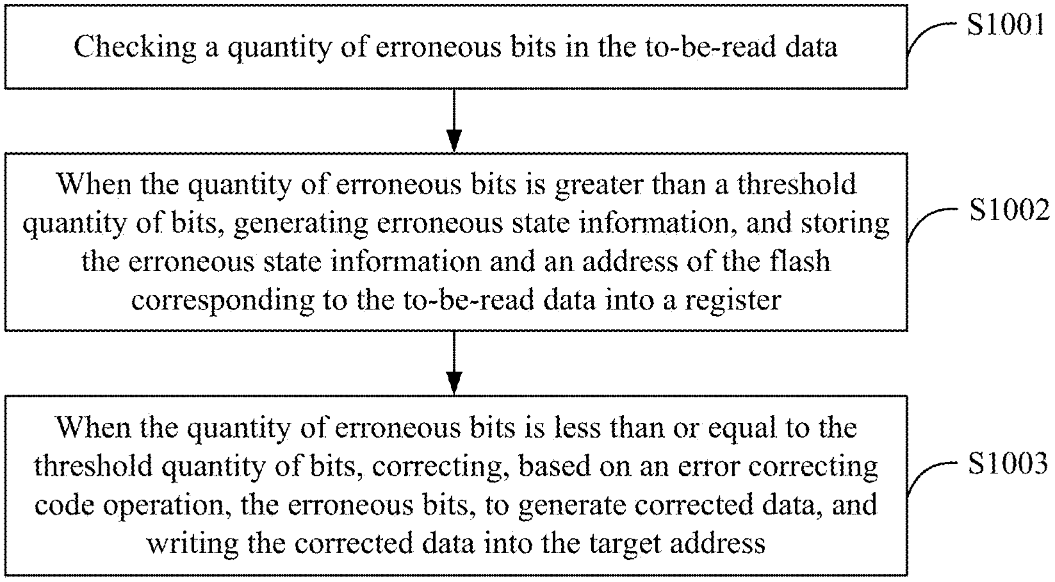
FIG. 10 is a schematic flowchart of another embodiment of S701 in FIG. 7 of the present disclosure.

Furthermore, in order to avoid errors in the data read by the user due to errors in the process of writing the to-be-read data packet into the static random access memory 110, in some embodiments of the present disclosure, as shown in FIG. 10, step S701 includes:

S1001, checking a quantity of erroneous bits in the to-be-read data;

S1002, when the quantity of erroneous bits is greater than a threshold quantity of bits, generating erroneous state information, and storing the erroneous state information and an address of the flash corresponding to the to-be-read data into a register;

S1003, when the quantity of erroneous bits is less than or equal to the threshold quantity of bits, correcting, based on an error correcting code operation, the erroneous bits, to generate corrected data, and writing the corrected data into the target address.

According to the embodiments of the present disclosure, by performing error-correction-code checking on the to-be-read data during the process of writing the to-be-read data into the target address, the reliability of the data written into the target address can be further ensured. Moreover, when the to-be-read data is erroneous during the process of writing it into the target address, a specific erroneous position can also be obtained through the address of the flash stored in the register, which is convenient for users to locate.

Figure 11:
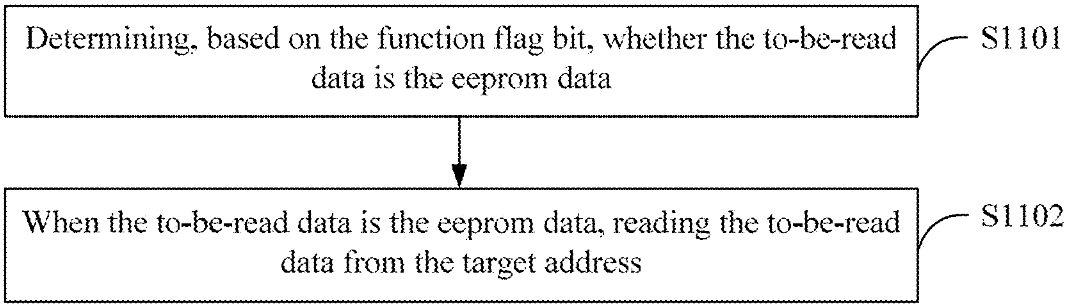
FIG. 11 is a schematic flowchart of an embodiment of S702 in FIG. 7 of the present disclosure.

In order to improve the utilization rate of the static random access memory 110, the static random access memory 110 can be used as an interface of the simulated EEPROM for caching EEPROM data, or as a regular sram for storing other data. To avoid the read data being erroneous due to other data stored in the static random access memory 110 being read as the EEPROM data, in some embodiments of the present disclosure, the static random access memory includes a function flag bit. As shown in FIG. 11, step S702 includes:

S1101, determining, based on the function flag bit, whether the to-be-read data is the EEPROM data;

S1102, when the to-be-read data is the EEPROM data, reading the to-be-read data from the target address.

In a specific embodiment of the present disclosure, the bit width of the static random access memory 110 is 33-bit, and the 33-rd bit, that is, bit[32], is used as the function flag bit; when bit[32]=0, the to-be-read data is not the EEPROM data; when bit[32]=1, the to-be-read data is the EEPROM data.

According to the embodiments of the present disclosure, the reliability of the to-be-read data that is read can be further ensured by using the function flag bit to further verify the to-be-read data.

Figure 12:
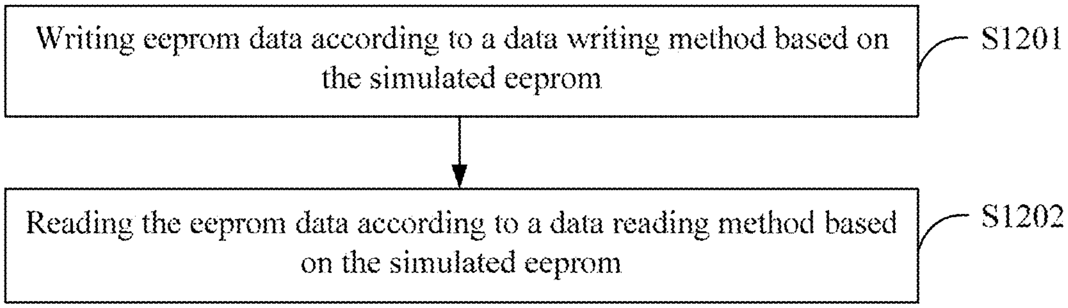
FIG. 12 is a schematic flowchart of an embodiment of a data management method based on a simulated EEPROM according to the present disclosure.

In another aspect, an embodiment of the present disclosure also provides a data management method based on a simulated EEPROM. As shown in FIG. 12, the data management method based the simulated EEPROM includes:

S1201, writing EEPROM data according to a data writing method based on the simulated EEPROM;

S1202, reading the EEPROM data according to a data reading method based on the simulated EEPROM.

The data writing method based on the simulated EEPROM is a step in a data writing method based on the simulated EEPROM in any embodiment of the above-mentioned embodiments of the data writing method based on the simulated EEPROM; the data reading method based on the simulated EEPROM is a step in a data reading method based on the simulated EEPROM in any one of the above-mentioned embodiments of the data reading method based on the simulated EEPROM.

Figure 13:
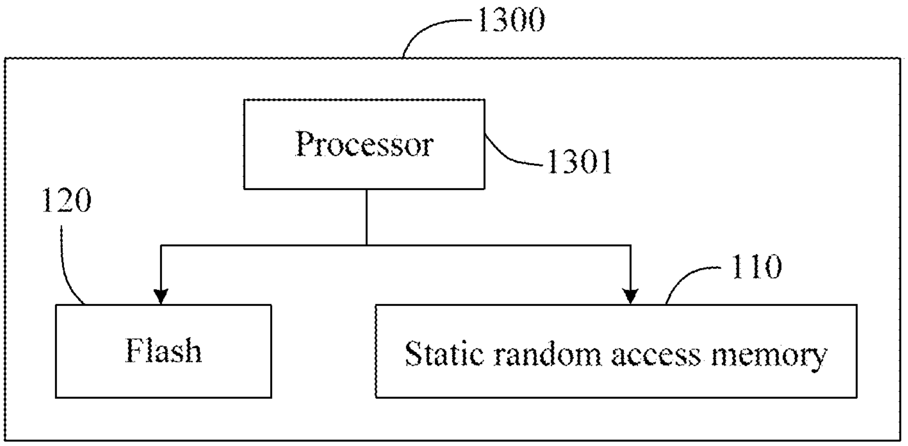
FIG. 13 is a schematic structure diagram of an embodiment of a data management system based on a simulated EEPROM according to the present disclosure.

In order to better implement the data management method based on the simulated EEPROM in the embodiments of the present disclosure, on the basis of the data management method based on the simulated EEPROM, correspondingly, as shown in FIG. 1 and FIG. 13, an embodiment of the present disclosure also provides a data management system 1300 based on the simulated EEPROM. The data management system 1300 includes: a processor 1301, the flash 120, and the static random access memory 110; where the flash 120 includes multiple storage groups 121.

The processor 1301 is configured to execute a step in a data writing method based on the simulated EEPROM in any embodiment of the above-mentioned embodiments of the data writing method based on the simulated EEPROM, and/or, in a data reading method based on the simulated EEPROM in any embodiment of the above-mentioned embodiments of the data reading method based on the simulated EEPROM.

Those skilled in the art can understand that all or part of the process of implementing the method in the above-mentioned embodiments can be completed by instructing relevant hardware through computer programs, the computer programs can be stored in computer-readable storage medium. The computer-readable storage medium includes a magnetic disk, an optical disk, a read-only storage memory, or a random access memory.

Detailed introduction has been made above to the data writing method and the data management method based on the simulated EEPROM according to the present disclosure. Specific examples are applied in this text to explain the principles and implementations of the present disclosure. The description of the above embodiments are only used to facilitate understanding of the methods and core concepts of the present disclosure. Meanwhile, for those skilled in the art, changes can be made to specific implementations and application scopes according to the concept of the present disclosure. In summary, the content of this specification should not be understood as the limitation to the present disclosure.

The invention claimed is:

1. A data writing method based on a simulated electrically erasable programmable read-only memory (EEPROM), wherein the simulated EEPROM comprises a static random access memory and a flash, the flash comprises at least two storage groups, the at least two storage groups comprise a first storage group and a second storage group; the data writing method based on the simulated EEPROM comprises:

writing to-be-written data into a target address of the static random access memory; and writing the to-be-written data into the first storage group in a preset writing order, and determining whether the first storage group is in a full storage state; when the first storage group is in the full storage state, writing the to-be-written data into the second storage group in the preset writing order, and erasing the to-be-written data in the first storage group;

wherein the data writing method based on the simulated EEPROM further comprises: packaging the to-be-written data, the target address and additional information, to generate a to-be-verified data packet, wherein the additional information comprises a valid flag bit; the valid flag bit is used to determine whether the to-be-verified data packet is valid;

wherein the data writing method based on the simulated EEPROM further comprises:

determining, based on the valid flag bit, whether the to-be-verified data packet is valid;

when the to-be-verified data packet is valid, writing the to-be-verified data packet into the first storage group in the preset writing order; and determining whether the first storage group is in the full storage state;

when the first storage group is in the full storage state, repackaging the to-be-written data, the target address and the additional information, to generate a recombinant data packet; and writing the recombinant data packet into the second storage group in the preset writing order, and erasing the to-be-verified data packet in the first storage group.

2. The data writing method based on the simulated EEPROM according to claim 1, wherein an additional bit added to an original bit width of the static random access memory is used as the valid flag bit.

3. The data writing method based on the simulated EEPROM according to claim 1, further comprising:

performing an error correcting code (ECC) operation on the to-be-verified data packet.

4. The data writing method based on the simulated EEPROM according to claim 1, wherein the depth of the respective storage group of the storage groups is twice as the depth of the static random access memory.

5. The data writing method based on the simulated EEPROM according to claim 1, wherein the at least two storage groups are at least three storage groups, the at least three storage groups comprise a head storage group, at least one middle storage group and a tail storage group; when the first storage group is the head storage group or the middle storage group, the second storage group is a next storage group adjacent to the first storage group; when the first storage group is the tail storage group, the second storage group is the head storage group.

6. The data writing method based on the simulated EEPROM according to claim 1, wherein the preset writing order is an order from top to bottom.

7. The data writing method based on the simulated EEPROM according to claim 1, wherein a depth of a respective storage group of the storage groups is greater than or equal to a depth of the static random access memory.

8. The data writing method based on the simulated EEPROM according to claim 1, wherein a last row of a respective storage group of the storage groups is used to store the number of erasures of the flash.

9. The data writing method based on the simulated EEPROM according to claim 1, wherein the valid flag bit being valid indicates that the to-be-written data in the to-be-verified data packet is EEPROM data.

10. A data management method based on a simulated electrically erasable programmable read-only memory (EEPROM), wherein the simulated EEPROM comprises a static random access memory and a flash, the flash comprises at least two storage groups, the at least two storage groups comprise a first storage group and a second storage group; the data management method based on the simulated EEPROM comprises:

writing EEPROM data according to a data writing method based on the simulated EEPROM;

reading the EEPROM data according to a data reading method based on the simulated EEPROM;

wherein the data writing method based the simulated EEPROM comprises:

writing to-be-written data into a target address of the static random access memory; and writing the to-be-written data into the first storage group in a preset writing order, and determining whether the first storage group is in a full storage state; when the first storage group is in the full storage state, writing the to-be-written data into the second storage group in the preset writing order, and erasing the to-be-written data in the first storage group;

wherein the data writing method further comprises: packaging the to-be-written data, the target address and additional information, to generate a to-be-verified data packet, wherein the additional information comprises a valid flag bit; the valid flag bit is used to determine whether the to-be-verified data packet is valid;

wherein the data writing method based on the simulated EEPROM further comprises:

determining, based on the valid flag bit, whether the to-be-verified data packet is valid;

when the to-be-verified data packet is valid, writing the to-be-verified data packet into the first storage group in the preset writing order; and determining whether the first storage group is in the full storage state;

when the first storage group is in the full storage state, repackaging the to-be-written data, the target address and the additional information, to generate a recombinant data packet; and writing the recombinant data packet into the second storage group in the preset writing order, and erasing the to-be-verified data packet in the first storage group.

11. The data management method based on the simulated EEPROM according to claim 10, wherein the at least two storage groups are at least three storage groups, the at least three storage groups comprise a head storage group, at least one middle storage group and a tail storage group; when the first storage group is the head storage group or the middle storage group, the second storage group is a next storage group adjacent to the first storage group; when the first storage group is the tail storage group, the second storage group is the head storage group.

12. A data management system based on a simulated electrically erasable programmable read-only memory (EEPROM), comprising: a processor, a flash and a static random access memory, wherein the flash comprises a plurality of storage groups; and the processor is configured to execute the data management method based on the simulated EEPROM according to claim 10.

13. The data management method based on the simulated EEPROM according to claim 10, wherein a respective storage group of the storage groups comprises a head row, a plurality of middle rows and a tail row, the head row and the middle rows are used to store to-be-read data; the data reading method based the simulated EEPROM comprises:

reading the head row and the tail row of the respective storage group of the storage groups in sequence, and determining, though a preset information packet marking bit, whether both the head row and the tail row are valid; and when both the head row and the tail row are valid, reading the to-be-read data in a preset reading order.

14. The data management method based on the simulated EEPROM according to claim 13, wherein the head row and the middle rows are further used to store address information, the reading the to-be-read data in the preset reading order comprises:

determining, based on the address information, the target address of the static random access memory, and reading the to-be-read data to the target address; and reading the to-be-read data from the target address of the static random access memory.

15. The data management method based on the simulated EEPROM according to claim 14, wherein the determining, based on the address information, the target address of the static random access memory comprises:

determining, based on the preset information packet marking bit, whether the to-be-read data is valid data; and when the to-be-read data is the valid data, determining, based on the address information, the target address of the static random access memory.

16. The data management method based on the simulated EEPROM according to claim 14, wherein the reading the to-be-read data to the target address comprises:

checking a quantity of erroneous bits in the to-be-read data;

when the quantity of erroneous bits is greater than a threshold quantity of bits, generating erroneous state information, and storing the erroneous state information and an address of the flash corresponding to the to-be-read data into a register; and when the quantity of erroneous bits is less than or equal to the threshold quantity of bits, correcting, based on an error correcting code operation, the erroneous bits, to generate corrected data, and writing the corrected data into the target address.

17. The data management method based on the simulated EEPROM according to claim 14, wherein the static random access memory comprises a function flag bit; the reading the to-be-read data from the target address of the static random access memory comprises:

determining, based on the function flag bit, whether the to-be-read data is the EEPROM data; and when the to-be-read data is the EEPROM data, reading the to-be-read data from the target address.

18. The data management method based on the simulated EEPROM according to claim 13, wherein the preset reading order comprises an order from top to bottom.

19. The data management method based on the simulated EEPROM according to claim 13, wherein the reading the to-be-read data in the preset reading order comprises:

reading the to-be-read data downwards in sequence in an order from top to bottom, and keep reading till a read row is invalid;

if a read preset information packet marking bit is neither equal to 16'hffff nor equal to 16'ha5cd, the to-be-read data is discarded.

* * * * *